United States Patent [19]

Poss et al.

[11] Patent Number: 5,708,248
[45] Date of Patent: Jan. 13, 1998

[54] APPARATUS FOR PULL SPOT WELDING

[75] Inventors: Michael Gerard Poss, St. Clair Shores; Joseph Michael Lendway, IV, Dryden; Charles J. Bruggemann, Rochester Hills; David Allen Gatny, Sterling Heights, all of Mich.

[73] Assignee: General Motors Corporation, Detroit, Mich.

[21] Appl. No.: 541,001

[22] Filed: Oct. 11, 1995

[51] Int. Cl.⁶ .................... B23K 11/11; B23K 11/36
[52] U.S. Cl. .................. 219/86.25; 219/86.9; 901/42
[58] Field of Search .................. 219/86.25, 86.9, 219/89; 901/42

[56] References Cited

U.S. PATENT DOCUMENTS 4,273,504  6/1981  Shimatake et al. ............... 901/42
5,030,814  7/1991  Tange et al. ..................... 219/86.9
5,151,570  9/1992  Sakurai ........................... 219/86.25
5,548,096  8/1996  Akasaka et al. .................. 219/117.1

FOREIGN PATENT DOCUMENTS 59-206176  11/1984  Japan.

*Primary Examiner*—Geoffrey S. Evans
*Assistant Examiner*—J. Pelham
*Attorney, Agent, or Firm*—Patrick M. Griffin

[57] ABSTRACT

An apparatus allows a robot arm located in from of a body panel to create a spot weld joint located inboard of and behind an edge of the panel. A bracket fixed to the wrist of the robot arm has an open side wide and deep enough to reach around and behind the panel edge, so that an electrode fixed to the bracket can be aligned with the desired weld location. Then, a power cylinder pulls the bracket inward until the electrode hits the weld point, under tension. The electrode then fires to create the joint, and is retracted and moved. The robot arm and wrist remain entirely in front of the panel, and no access holes in the panel are needed to reach the remote weld point.

2 Claims, 2 Drawing Sheets

APPARATUS FOR PULL SPOT WELDING

This invention relates to spot welding in general, and specifically to an apparatus for spot welding with a robot arm that allows a joint behind a vehicle body and seam to be accessed and welded by a robot located in front of the body seam.

BACKGROUND OF THE INVENTION

Resistance welding is a broad term that covers several welding processes in which the heat needed for welding is generated by the electrical resistance of the materials themselves that are being welded. The best known of these processes is generally called spot welding, in which overlapping sheet metal surfaces forming a seam are joined at one or more generally circular joints or spots created by the localized application of electrical current. The most common spot welding process uses a large clamping gun that pinches both sides of a sheet metal seam between two electrodes. This obviously requires equal physical tool access from both sides of the seam. A newer known method of spot welding, called single sided single point spot welding, attaches one electrode, typically the negative, to the body at a point remote from the seam. This remote electrode may be backed up by a larger copper plate that enhances the electrical connection. The positive electrode is then pushed and compressed into the sheet metal seam from one side only, completing the weld at that spot. System flexibility is improved since only access from the front of the seam is needed.

There are instances where conventional single sided single point spot welding is difficult or impossible. This is especially true when large robot arms are used to carry the positive electrode. A vehicle body panel seam may be located behind the body panel, and forming its weld joints will require tool access behind the body panel. Only by cutting an access hole through the front of the body panel to allow the positive electrode to be pushed through the panel to reach the remote seam can the conventional welding robot apparatus be used.

SUMMARY OF THE INVENTION

The invention provides a robot assisted single sided single point spot welding apparatus that allows a seam joint which is located inboard of and behind an edge of a body panel to be accessed and welded while the robot and arm are located entirely in front of the body panel.

In the preferred embodiment disclosed, the robot has a large movable arm with a turnable wrist at the end, to which any tools that actually contact a workpiece are attached. The wrist has a centerline, around which it can twist, and along which reactive forces from the tool can most efficiently act. Besides twisting about its centerline, the wrist can be moved by the robot arm along two mutually perpendicular axes that are both perpendicular to the centerline, and can also be moved back and forth directly along the centerline.

To allow the robot arm to effectively work behind the edge of the panel, a generally C shaped bracket is slidably fixed to the robot arm wrist, so as to be able to move back and forth parallel to the wrist centerline. A power cylinder located between the arm wrist and the bracket moves the bracket slidably and forcibly along the centerline, toward and away from the wrist. An electrode is located on the front end of the bracket so as to be aligned with the wrist centerline as the power cylinder moves the bracket relative to the wrist. The open side bracket also has sufficient width and depth to be capable of hooking the electrode around and behind the body panel edge, in line with the desired weld joint location, as the robot arm wrist is maneuvered generally parallel to the body panel. The robot arm and wrist remain in from of the panel, however. Then, the power cylinder pulls the bracket in along the wrist centerline, forcibly into the body panel seam. The electrode is then fired to create the weld joint.

DESCRIPTION OF THE PREFERRED EMBODIMENT

These and other features of the invention will appear from the following written description, and from the drawings, in which.

Figure 1:
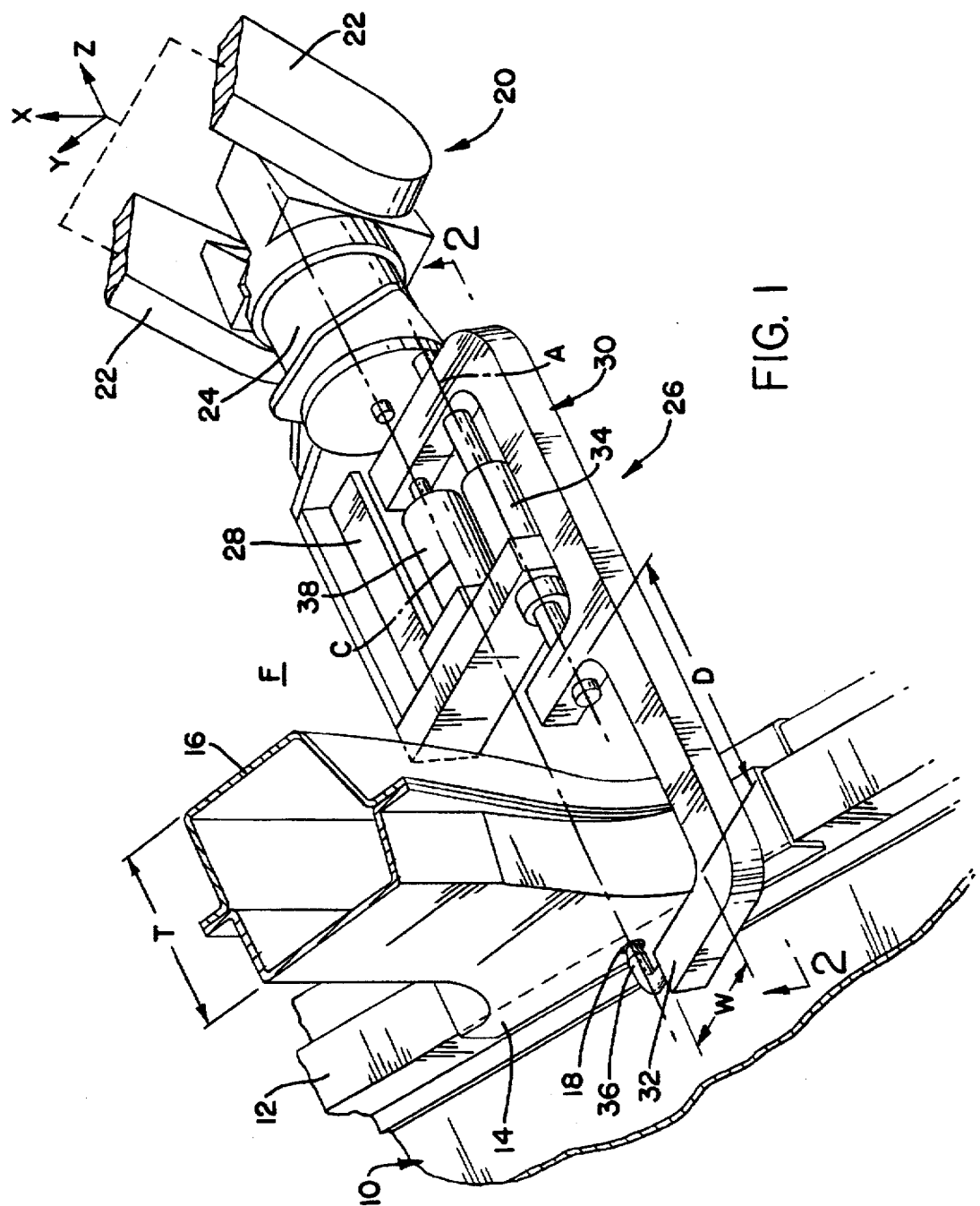
FIG. 1 is a perspective view of part of a robot arm, wrist and the apparatus of the invention, as well as a portion of a body panel.

Referring first to FIG. 1, a vehicle sheet metal body panel, indicated generally at 10, would be solidly fixed to a pallet or other fixture on the factory floor, not illustrated. Panel 10 is a composite of several sheet metal stampings that are welded together. The general location indicted at F is designated the front relative to panel 10, meaning that it is the location where free tooling access is available. Here, a panel edge formed by a beam 12 blocks access to a seam 14 between beam 12 and the bottom of a pillar 16. Seam 14 is to be secured by several electrical resistance formed weld joints; also called spot welds, the location of one of which is indicated at 18. It will be noted that the desired location of spot weld 18 is well inboard of both beam 12 and pillar 16. A robot, indicated generally at 20, of which only the end of the arm 22 is shown, is located entirely in front of panel 10, and cannot be moved directly behind it. As will be known to those skilled in the art, robot 20 has a large, fixed base, relative to which arm 22 can move in three orthogonal axes, indicted in the usual manner at x-y-z. Panel 10 is also oriented such that its surface area lies basically in the x-y plane, and its thickness lies basically along the z axis. The end of arm 22 comprises a wrist 24 which, in addition to moving along the three axes with the arm 22, can rotate about it's own centerline, shown by the dotted line C. Wrist 24 is the part of arm 22 to which any tool would be attached, and with which the tool would be maneuvered. It is preferable, for reasons of strength and stability, that any tool forces be reacted along the wrist axis C, if possible. Arm 22 and wrist 24 can move freely in all directions along, parallel to, and toward and away from the body panel 10, so long as it is in front of the panel 10. It is thus ideal for conventional one sided spot welding in which a tool is pushed against panel 10 from the front. What wrist 24 cannot do is pass through panel 10 to the back, without an access hole being provided, and an access hole is not feasible here.

Still referring to FIG. 1, the apparatus of the invention, indicated generally at 26, works in conjunction with robot arm wrist 24 to allow seam 14 to be welded despite its location behind panel 10. Apparatus 26 includes a generally L shaped frame 28 that is fixed to and moves one to one with the wrist 24, acting as an extension thereof, in effect. A C or U shaped bracket, indicated generally at 30, has an open side of sufficient width W, as measured in the x-y plane, and sufficient depth D that its forward end or leg 32 is able to reach behind pillar 16 and inboard of the beam 12 far enough to align with the desired weld joint location 18, but with clearance therefrom. Here, that sufficient depth D is greater that the thickness T of pillar 16. In the embodiment disclosed, bracket 30 is not fixed solidly to wrist 24, but instead is slidably attached to frame 28 by a sleeve and post bearing assembly 34. Bracket 30 can therefore slide back and forth, toward or away from wrist 24, on an axis A that is parallel to the wrist axis C. Fixed to the bracket forward end 32 is a weld electrode 36 which lies in line with the wrist axis C. Electrode 36 would be connected into a standard weld circuit, not illustrated. Finally, a power cylinder 38, also in line with the wrist centerline C, is secured between bracket 30 and the frame 28. Cylinder 38 is able to selectively pull bracket 30 toward wrist 24, when the cylinder 38 is extended, or to push bracket 30 away from wrist 24, when cylinder 38 is retracted. As it is so moved, bracket 30 is securely supported by the bearing assembly 34 to move in line along axis A and parallel to axis C. If, in ram, the robot arm 22 is oriented so that its axis C is parallel to axis Z, substantially perpendicular to panel 10, then bracket 30 also moves back and forth along and parallel to axis Z. Cylinder 38 could be powered by air, hydraulics, or any other means desired, and the actual source of its power is not specifically illustrated in the interests of simplicity.

Figure 2:
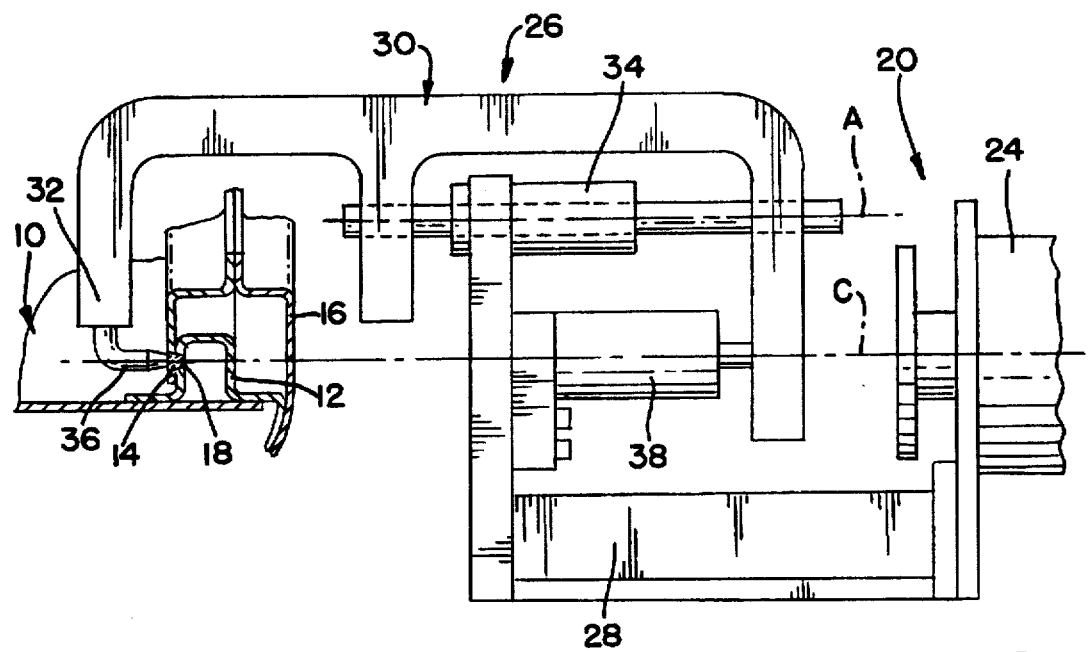
FIG. 2 is a plan view of the apparatus in welding position, showing a section through the body panel in the plane indicated by the line 2—2 in FIG. 1, with the electrode pulled snug to the joint location.
Figure 3:
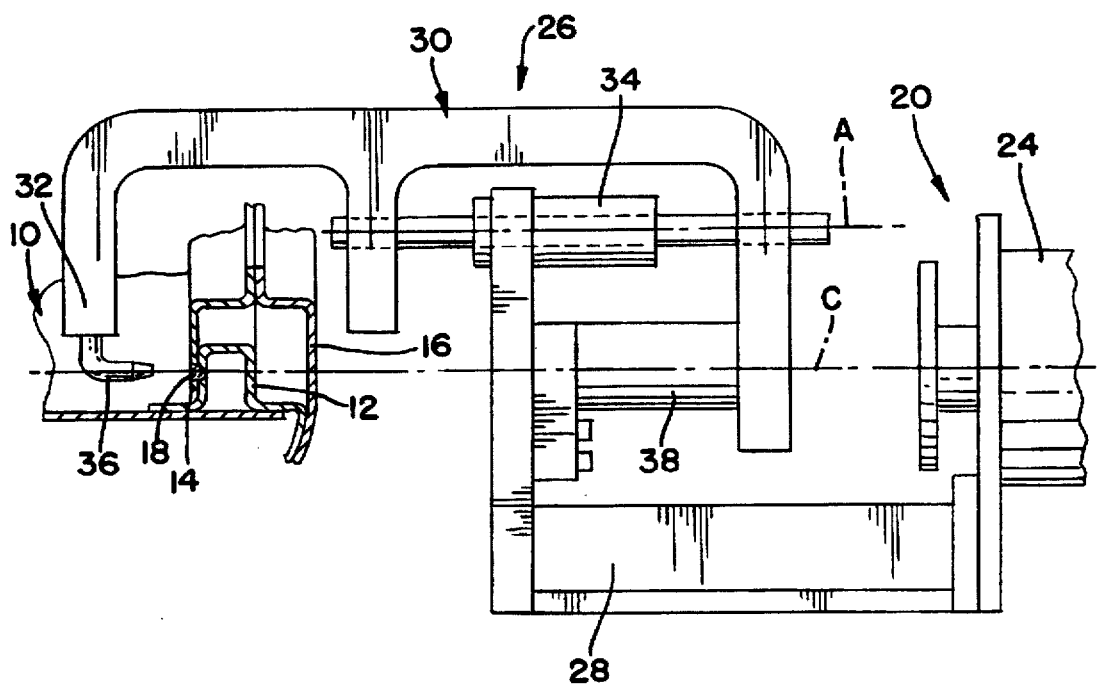
FIG. 3 is a view like FIG. 2, showing the electrode backed off from the joint location, after firing.

Referring next to all of the figures, the operation of apparatus 26 is illustrated. First, as shown in FIG. 3, cylinder 38 is retracted so as to push bracket 30 and electrode 36 out and away from wrist 24 as far as possible. Then, arm 22 and wrist 24 are maneuvered along the X-Y plane so as to hook the bracket forward end 32 and the electrode 36 behind the pillar 16, until the electrode 36 is aligned with the desired weld location 18. At this point, the axes A and C are also both parallel to the axis Z. Then, as shown in FIG. 2, the cylinder 38 is extended so as to pull the bracket forward end 32 and electrode 36 in relative to wrist 24, along the Z axis, generally perpendicular to the panel 10. Based on the predetermined location of panel 10 as fixture, and on the known location of robot arm 22 relative thereto, bracket 30 is deliberately positioned along the Z axis such that the travel provided by extending the cylinder 38 is sufficient to pull the electrode 36 far enough inward to contact seam 14 with enough force to provide an adequate weld. Determining the clamping force necessary against seam 14 is well within the skill in the art, and the tension force created by pulling electrode 36 against the seam 14 will be resisted both by the fixture that holds panel 10, and by the robot arm 22. Most importantly, the location of electrode 36 in line with the wrist axis C assures that those clamping forces will be reacted along the axis C. Once electrode 36 has been fired to the create the spot weld at the desired location 18, the cylinder 38 is again retracted, to the FIG. 3 position, and bracket 30 is maneuvered to the next spot where a weld is desired.

When used as described above, apparatus 26 provides spot welds behind panel 10, even though robot arm 22 and wrist 24 remain entirely in front of panel 10. Therefore, welding robots need not be provided on both sides of panel 10. Nor is it necessary to provide access holes to reach the remote weld locations, as would be the case with a conventional single sided spot welding apparatus, which can work only from the front of panel 10. It would also be possible to combine the apparatus 26 disclosed with an independently operable conventional single sided spot welding apparatus, and thus access weld locations on both sides of a panel with a single robot arm. Other variations of the apparatus 26 disclosed would be possible. The power cylinder 38 could be located anywhere on the bracket 30 that allowed it to push and pull the bracket 30 relatively toward and away from the robot arm wrist 24. Or, a bracket like 30 could be solidly fixed to the wrist 24, rather that slidably attached, and the power cylinder 38 could be located directly between the bracket forward end 32 and the electrode 36. So long as the electrode 36 is fixed to the wrist 24 by an open sided mechanical means, be it U shaped, C shaped, or other wise generally hook shaped, and so long as the open side has sufficient width and get behind the seam with clearance, then it will be possible to get the electrode attached thereto in and behind the panel 10 and in line with the desired weld location. Then, some power mechanism can be provided that moves the electrode 36 forcibly toward the wrist 24 and, therefore, toward the interposed panel 10, far enough to forcibly contact the electrode 36 with the seam 14. That power mechanism can move the electrode directly, reacting off of the bracket, or can move the electrode indirectly by moving the bracket toward the wrist 24 instead, as is disclosed. Therefore, it will be understood that it is not intended to limit the invention to just the embodiment disclosed.

We claim:

1. An apparatus for single sided, robot assisted spot welding a sheet metal seam at a weld point located inboard of, and behind, an edge of a body panel with a robot arm located in front of said panel, and in which said robot arm has a wrist with a defined centerline of action and is capable of moving in three mutually orthogonal axes, one of which is parallel to said wrist centerline and substantially perpendicular to said body panel, and the other two of which are substantially parallel to said panel, said apparatus comprising, an open sided bracket fixed to said robot arm wrist so as to be capable of moving with said wrist, the open side of said bracket having sufficient width and depth so that the forward end thereof is capable of being maneuvered inboard of and behind said body panel edge and seam with clearance as said robot arm wrist is moved along said other two axes, a spot welding electrode on said bracket forward end, a power mechanism to move said electrode forcibly toward said body panel along said one axis, whereby said joint may be spot welded by maneuvering said bracket forward end inboard of and behind said body panel edge until said electrode is aligned with said weld point and then moving said electrode forcibly toward said wrist until said electrode moves into contact with said seam, while said robot and robot arm remain in front of said body panel.

2. An apparatus for single sided, single point robot assisted spot welding a sheet metal seam at a weld point located inboard of, and behind, an edge of a body panel with a robot arm located in front of said panel, and in which said robot arm has a wrist with a defined centerline of action and is capable of moving in three mutually orthogonal axes, one of which is parallel to said wrist centerline and substantially perpendicular to said body panel, and the other two of which are substantially parallel to said panel, said apparatus comprising, an open sided bracket joined to said robot arm wrist so as to be slidable relative to said wrist parallel to said one axis, but fixed relative to said wrist relative to said other two axes, the open side of said bracket having sufficient width and depth so that the forward end thereof is capable of being maneuvered inboard of and behind said body panel edge and seam with clearance as said robot arm wrist is moved along said other two axes, a spot welding electrode on said bracket forward end, a power cylinder operably connected between said robot arm wrist and bracket to pull said bracket forcibly toward said wrist along said one axis, whereby said joint may be spot welded by maneuvering said bracket forward end inboard of and behind said body panel edge until said electrode is aligned with said weld point and then moving said bracket and electrode slidably toward said wrist under force until said electrode moves into contact with said seam, while said robot and robot arm remain in front of said body panel.

* * * * *